(12) United States Patent
Fedorovskaya et al.

(10) Patent No.: US 8,154,615 B2
(45) Date of Patent: Apr. 10, 2012

(54) METHOD AND APPARATUS FOR IMAGE DISPLAY CONTROL ACCORDING TO VIEWER FACTORS AND RESPONSES

(75) Inventors: Elena A. Fedorovskaya, Rochester, NY (US); Carman G. Neustaedter, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 347 days.

(21) Appl. No.: 12/495,411

(22) Filed: Jun. 30, 2009

(65) Prior Publication Data

US 2010/0328492 A1 Dec. 30, 2010

(51) Int. Cl.
*H04N 5/228* (2006.01)
(52) U.S. Cl. .............................. 348/222.1; 348/333.01
(58) Field of Classification Search ............ 348/207.99, 348/222.1, 333.01
See application file for complete search history.

(56) References Cited

U.S. PATENT DOCUMENTS

| | | | |
|---|---|---|---|
| 5,946,444 A | 8/1999 | Evans et al. | |
| 6,608,563 B2 | 8/2003 | Weston et al. | |
| 6,931,147 B2 | 8/2005 | Colmenarez et al. | |
| 7,174,029 B2 | 2/2007 | Agostinelli et al. | |
| 7,236,960 B2 | 6/2007 | Manico et al. | |
| 7,460,150 B1 * | 12/2008 | Coughlan et al. | 348/169 |
| 2003/0067476 A1 * | 4/2003 | Miller et al. | 345/598 |
| 2003/0088832 A1 | 5/2003 | Agostinelli et al. | |
| 2004/0044564 A1 | 3/2004 | Dietz et al. | |
| 2004/0126038 A1 | 7/2004 | Aublant et al. | |
| 2005/0080671 A1 | 4/2005 | Giraud et al. | |
| 2005/0105805 A1 | 5/2005 | Nicponski | |
| 2006/0112334 A1 * | 5/2006 | Endrikhovski et al. | 715/700 |
| 2007/0098303 A1 | 5/2007 | Gallagher et al. | |
| 2007/0177805 A1 | 8/2007 | Gallagher | |
| 2009/0112696 A1 | 4/2009 | Jung et al. | |
| 2009/0315869 A1 * | 12/2009 | Sugihara et al. | 345/204 |

OTHER PUBLICATIONS

Gary Burrows: "Ubiquitous Interactive Art Displays: Are they Wanted, are they Intuitive?" Jan. 2006 The Information Science Discussion Paper Series No. 2006/02 ISSN 1172-6024.
R.J. Prance: "Biological and medical applications of a new electric field sensor" Proc. ESA Annual Meeting on Electrostatics 2008, Paper N2.
M. Jones: "Fast Multi-view Face Detection" Jul. 2003 Mitsubishi Electric Research Laboratories MERL-TR2003-96.
A. Savakis: "A Multi-Camera System for Real-Time Pose Estimation" Proc. SPIE Defense and Security Symposium, intelligent Computing: Theory and Applications V, Orlando FL, Apr. 2007 (to follow).
A. Torralbo: "Contextual guidance of eye movements and attention in real-world scenes: The role of global features on object search" Psychological Review. vol. 113(4) 766-786 Oct. 2006.
S. Shimojo: "Gaze bias both reflects and influences preference" Nature Neuroscience vol. 6 No. 12 Dec. 2003.
A. Gallagher: Jointly Estimating Demographics and Height with a Calibrated Camera IEEE International Conference on Computer Vision (ICCV), 2009 (to follow).

* cited by examiner

*Primary Examiner* — Gevell Selby
(74) *Attorney, Agent, or Firm* — Kevin E. Spaulding (57) ABSTRACT

A device and system and a method for selecting and displaying images in accordance with attention responses of an image viewer. An image capture device captures a viewer image of a spatial region potentially containing a viewer of the image display device and a viewer detection mechanism analyzes the viewer image and determines whether a potential viewer is observing the display screen. A gaze pattern analysis mechanism identifies a viewer response to a currently displayed image by analysis of the viewer's emotional response as revealed by the viewer's facial expression and other sensory inputs, and the selection of an image to be displayed is then modified in accordance with the indicated viewer's attention response.

17 Claims, 5 Drawing Sheets

METHOD AND APPARATUS FOR IMAGE DISPLAY CONTROL ACCORDING TO VIEWER FACTORS AND RESPONSES

CROSS REFERENCE TO RELATED APPLICATIONS

Reference is made to commonly assigned, co-pending U.S. Patent Application Pub. No. 2005/0105805 to Nicponski filed Nov. 13, 2003 the disclosures of which are incorporated herein by reference.

FIELD OF THE INVENTION

The present invention relates to the adaptive selection and display of images and, more specifically, to the selection and display of images, including both individual images and sequential images, such as video clips, in a digital media frame or other image display system or device, such as an electronic frame or other display device, according to the detected presence and responses of an image viewer, including the viewer's emotional and behavioral responses or deduced intent or desires of an image viewer.

BACKGROUND OF THE INVENTION

The indexing, sorting, storing and selective display of desired images from potentially very large collections of still and sequential images, for example, photographs and video clips, is and has been a common and long standing problem. This problem has been significantly aggravated by the development of digital imaging technologies, which facilitates the creation of large numbers of new images with little effort and in greatly increased numbers compared with film based methods.

The task of identifying, sorting and indexing images has traditionally been performed manually, that is, someone looks at each image, identifies the contents of the image, and sorts and indexes the images according to their contents and any other pertinent criteria, such as the location and time an image was acquired. As is well known, this method tends to be slow, tedious and prone to errors and must be repeated whenever the criteria used to identify and sort the images is changed.

The prior art includes a number of methods and systems for facilitating the indexing and sorting of images, examples of which are shown in U.S. Pat. Nos. 7,236,960, 5,946,444 and 6,608,563 and U.S. Patent Publications 2007/0177805, 2007/0098303, and 2004/0126038, as well as many other similar and related publications. All of these methods and systems of the prior art are directed to the identification, sorting and organizing or indexing the images of a collection of images according to a criteria based upon the contents of the images. For example, a typical criteria may include the date, time and location at which an image was acquired and information pertaining to the contents of the images. Image content in turn may be obtained, for example, by various image analysis methods, such as image features recognition techniques, image metadata produced by image capture devices, built-in GPS devices, or information read or recorded from persons or objects in an image at the time of image acquisition via for example RFID tagging or audio sensing. Once indexed, images may be selected from a collection of images according to information stored in or forming the image indexes, which is typically based on the criteria used to identify and sort the images, and displayed according to additional criteria defined by a user, such as a page or album format definition.

These methods and systems of the reviewed prior art, however, require the user or a service provider, or the system by default, to be consciously and directly involved in the process and, in particular, in selecting and defining the specific criteria by which the images are analyzed, identified, sorted, indexed and displayed. This requirement is particularly burdensome on users that only occasionally identify, sort, organize and display collections of image as such users are typically not familiar with the criteria for identifying, sorting and indexing images or with the effective selection and combination of such criteria and may often obtain unsatisfactory results.

Related problems also exist in the display of images from one or more collections. For example, many image storage and display systems, ranging from on-line services to personal computers to hand held devices, including devices such as PDAs, require a user to directly and actively select images or a set of images to be displayed. Such system and devices often either require a user to at least deliberately initiate a display and often require the user to actively control the display of images, such as the image succession interval in a "slide show". It is also often difficult to change the image or set of images being displayed, either requiring the initiation of a new display operation or, in some devices such as digital picture frames, the loading of an entirely new set of images into the device.

U.S. Pat. No. 7,174,029 discloses a method and apparatus including a display for sensing a characteristic of one or more individuals and providing automatic selection and presentation of information so as to tailor a specific content/program to improve the effectiveness of the display according to the individual. Sensing devices, including digital cameras, motion sensors, pressure sensitive sensors in a floor mats, audio sensors, RFID cards, etc. can be used to sense essentially static characteristics, which are stable for individuals, based on demographics, psychographics, cohort group, and identity. These non-transitory characteristics of the individual are for example: age, gender, facial hair, eyeglasses, and height. This reference emphasizes that these static characteristics may be used to classify individuals as to differences in their needs and preferences for various products and therefore presumably be responsive to images of different advertising informational programs. Even if more than one static characteristic is used to classify an individual, the image display based on that classification does not change during the individual's interaction with the display.

In a reference by Burrows entitled, "Ubiquitous Interactive Art Displays: Are they Wanted, are they intuitive?", 2006, an interactive art display system is described that includes video cameras to assess proximity of the viewer from the display and position of the viewer's face relative to the display. These assessments are used to incrementally run through a video sequence as the viewer approaches, stops or moves away from the art display. In this reference information is presented based on the proximity of the viewer and detection of the viewer's face. There is however no customization of the information based on the viewer's individual characteristics, emotions, reactions or behaviors.

None of these references recognize or disclose the needs, preferences and ability to respond and process different types of information can to a large degree depend on external and internal behavior conditions of the individuals that are transient and relevant to the local and short-term events, such as intent, emotional, mental and physical state, involvement in specific activities and interactions; as well as direct emotional and behavioral reactions of an individual to the displayed content. Moreover, the methods and processes of presenting individualized images and information in general, such as pace, repetitions, selection of modalities (visual still, video, audio, tactile), special effects, transitions, etc. which we will call display controls, need to account for those external and internal conditions as well. Therefore recognizing users' interest, emotions, behavior, intent and social and environmental context provides an advantageous property of interactive systems that are responsive to user needs, personal preferences and interests.

In attempt to overcome these user interaction requirements many current image storage and display systems provide options for randomly presenting images, but such random displays may not relate to the user's present state of mind, intent or context of a viewing event. Even where certain characteristics of an individual are accounted for such characteristics are non-transitory i.e. they do not change with time so there is no way to gauge a viewer's response to the images.

U.S. Pat. No. 6,931,147 by Comenarez et al. entitled "Mood based virtual photo album" disclosed a system for providing a mood based presentation of the photographs based upon a sensed mood of the viewer. The method includes the steps of capturing a facial image of the viewer using a camera, analyzing the image using a pattern recognition algorithm to determine a mood of the viewer by comparing the facial expression with a plurality of previously stored images of facial expressions associated with the list of moods, and then retrieving a set of photographs from the storage based on the emotional identification associated with the facial expression of the viewer. The system includes a camera, a user interface, a processor to analyze a facial image of the viewer for comparing with the set of pre-selected facial expression images used to determine a mood of the viewer and a display that is used to show a set of digital photographs corresponding to the mood of the viewer.

The above described system reacts to the viewer's facial expression and derived mood by presenting images and updating them according to the determined mood of the viewer, and therefore attempts to overcome limitations of currently prevalent methods and systems that use retrieval mechanisms either not related to the elements of user identity at all, or in response to stable characteristics such as gender, age, etc. However, the system has several shortcomings. First of all it is explicitly directed to only affect a viewer's mood being discerned from facial expression, thus making its utility and mode of interaction limited to capturing and responding to the viewer's facial expression of emotion. As a consequence, other meaningful situations and user's actions, as such as motion, conversations, specific activities, environmental (contextual) conditions would not result in appropriate display content modification. For example, if the user is hastily approaching an interactive display system in order to check the time for the scheduled meeting and his/her face expresses anxiety because the user may be late, such a system would keep attempting to change the user's mood by, for example, displaying images to elicit positive feelings such as images of chocolate or images of a dog based on pre-determined association between dog pictures and positive emotions.

Secondly, the emotions in this system are recognized based on the user's facial image obtained via video camera. However, there exists a multiplicity of emotional responses that could be derived from other user-related signals. Such signals correspond among others to gestures, hand and body postures, gait, audio and speech signals, bio-electrical signals and eye movements as an example.

Thirdly, such a display system is limited in its ability to respond and maintain user's engagement because there is not a method of sensing and monitoring user's engagement and interest. For example, the system does not have means to infer whether the user is looking at the display and interested in the interaction with the system.

Fourthly, the system does not have a means to differentiate between different viewers. Thus, different family members would not be recognized as having different interactive needs and emotional responses to the same images.

For example, young children and teenagers will likely produce a positive reaction and be much more interested in viewing images of themselves, and less interested in viewing images of family members, while adults will enjoy images of their children.

The present invention overcomes these and other shortcomings based on providing means for recognizing user identities and reactions via a combination of sensing modalities, providing engaging interactive capabilities which are tailored to individual needs and interaction intent and responding to the users by presenting images, multimedia and other informational material based on changing behavioral, facial and other modalities related to users' actions over a predetermined time—it is an intelligent method for presenting and interacting with multimedia, video and other informational programs which permits the display system to account in an intelligent manner appropriately for the viewer's interaction intent, state of mind and identity characteristics.

The present invention addresses and provides solutions to these and other problems of the prior art.

SUMMARY OF THE INVENTION

The present invention is directed to a device, a system and a method for selecting and displaying images and informational programs in accordance with sensing and interpreting aspects of the viewer's identity, intentions and actions, which are expressed through behavioral and emotional responses, of an image viewer, including a display, reasoning and control mechanism for selecting at least one image or informational program from a library of images or informational programs for display by an image or informational program display device and an image or informational program, control mechanism for determining a viewer's interaction intention and response to a currently displayed image or informational program and providing a response output identifying a viewer response to a currently displayed image.

The present invention for displaying images and informational programs in accordance with a viewer's intention and responses includes an image capture device for capturing a viewer image of a spatial region potentially containing a viewer of the image display device and a viewer detection mechanism for analyzing the viewer image and determining whether a potential viewer is observing the display screen or is intending to observe and interact with the display. The image capture device comprises a multiplicity of sensors which include audio, motion, proximity, heat, electro-magnetic field and chemical sensors to capture multimodal image of the viewer. The present invention includes a head, facial, eye and body language pertaining behavior analysis mechanism for identifying a viewer's identity, interaction intent and response to a currently displayed image and/or informational program by analysis of the viewer's behavioral, body and emotional response and preferences as revealed by the viewer's facial expression, body language, behavioral expressions, gestures and gaze (in combination with the history of past responses, and information about future activities which could be known by the system from the viewer's electronic calendar, agenda or similar database or by some other means.)

The selection of an image or informational program to be displayed is then modified, if necessary, in accordance with the indicated viewer's response.

The present invention is an image display mechanism for selecting images to be displayed in accordance with facially expressed responses of an image viewer, comprising a display control mechanism for selecting at least one image from an image library for display by an image display device, and an image control mechanism for determining a viewer response to a currently displayed image and providing a response output identifying a viewer response to a currently displayed image.

The present invention also relates to an image display mechanism for selecting images to be displayed in accordance with facially expressed and behavioral responses of an image viewer comprising a display control mechanism for selecting at least one image from an image library for display by an image display device, and an image control mechanism for determining a viewer's attentiveness to a currently displayed image and providing a response output according to at least one of the viewer's facially expressed and behavioral response to a currently displayed image.

The present invention further relates to a method for selecting images to be displayed in accordance with facially expressed and behavioral responses of an image viewer comprising the steps of selecting at least one image from an image library for display by an image display device, and determining a viewer's response to a currently displayed image by analysis of a facial expression and gaze pattern of the image viewer, and providing a response output based upon the viewer's response to a currently displayed image.

The invention still further relates to an image display device comprising an image library for storing at least one image in at least one set of images, an image display, a display control mechanism for selecting from the image library at least one image for display by the image display, and an image control mechanism for determining a viewer response to a currently displayed image and providing a response output according to a viewer response to a currently displayed image.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

As described briefly above, the present invention is directed to a method and system for the adaptive selection and display of images and informational programs and, more specifically, for the selection and display of images, including both individual images and sequential images, such as video clips, in an image display system or device, such as an electronic frame, personal computer or computer/terminal connected to a service provider, flat panel display or display on the personal portable device including cell phone, or PDA, according to the detected presence and responses of an image viewer, including the viewer's emotional responses or the deduced intent or desires of the image or informational program viewer.

Figure 1:
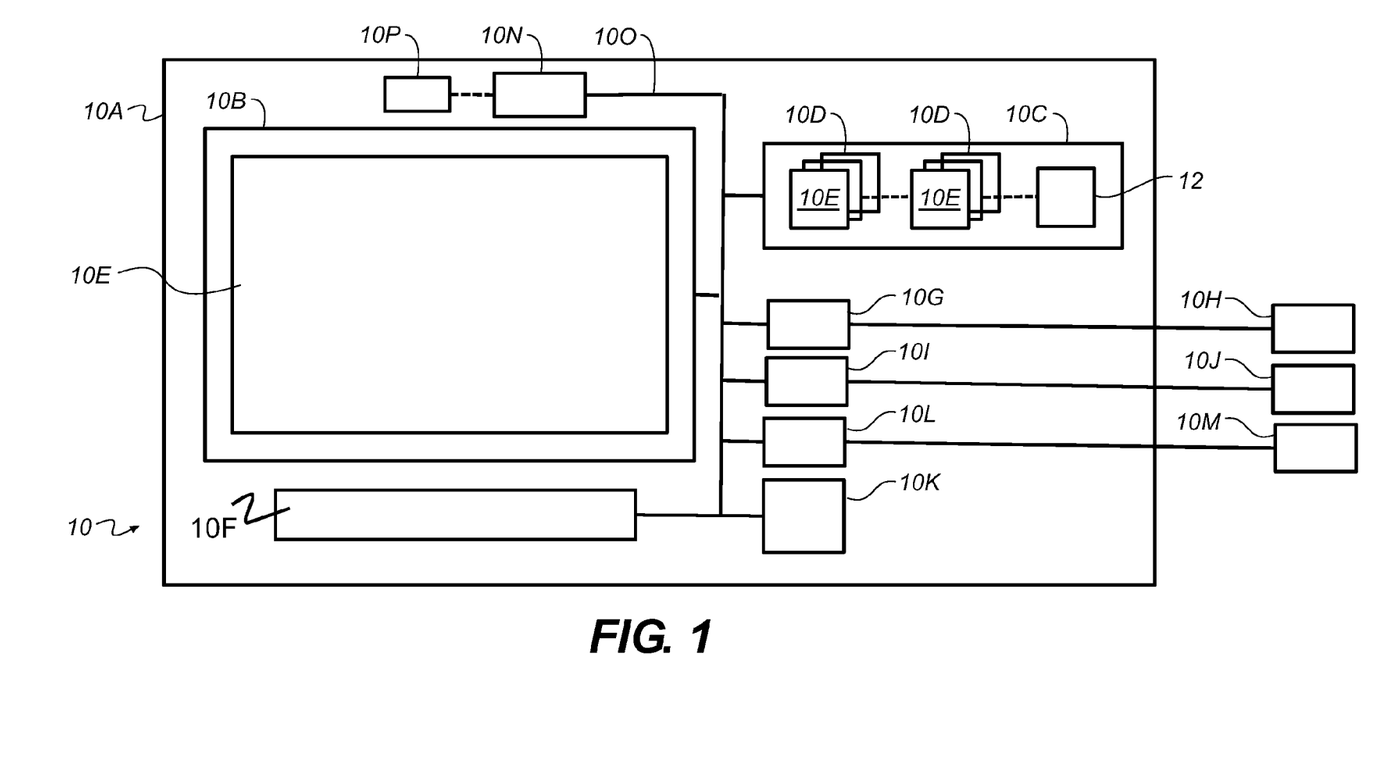
FIG. 1 is a diagrammatic representation of an exemplary image display device.
Figure 2:
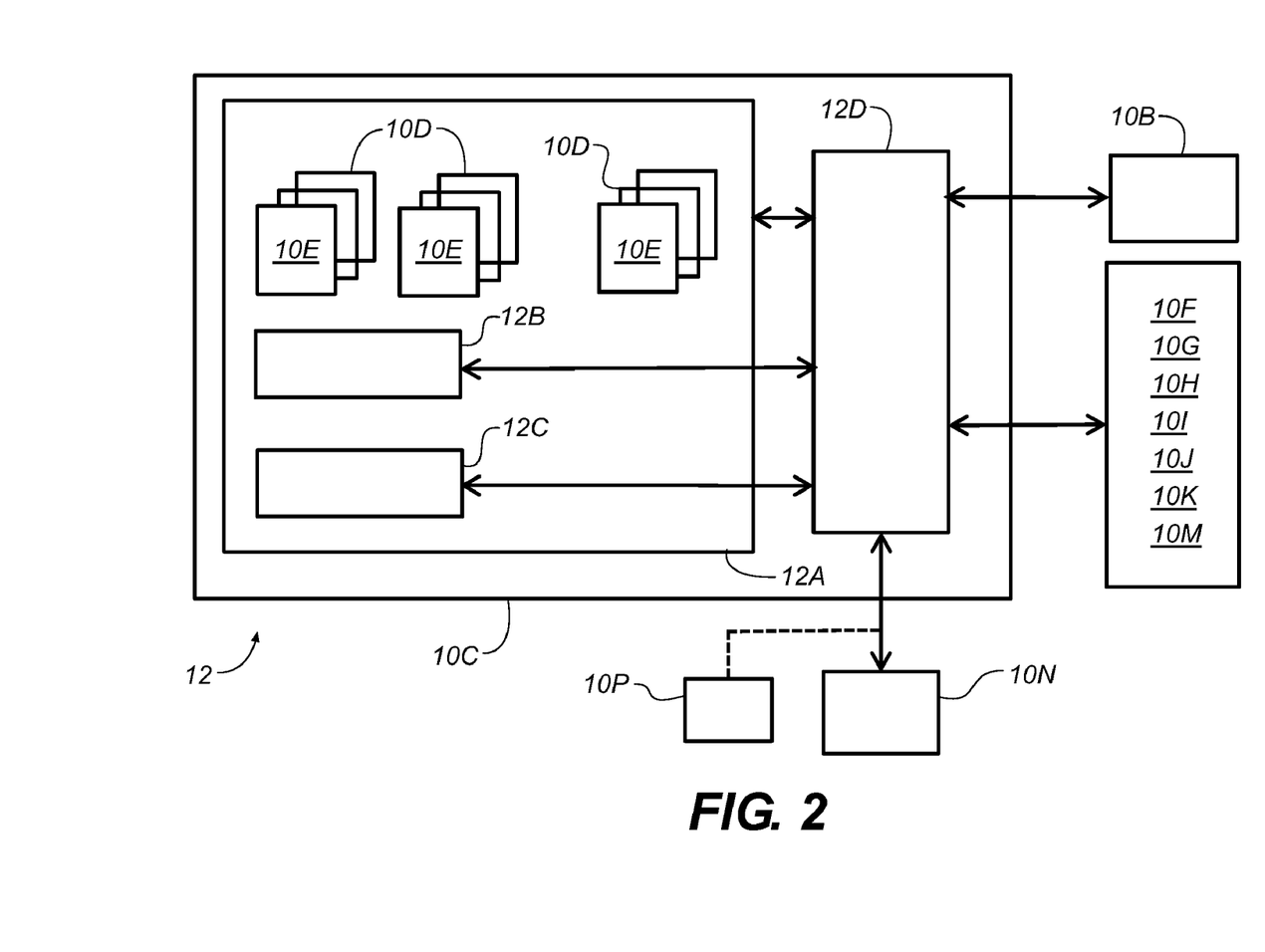
FIG. 2 is a diagrammatic representation of an electronics and memory control unit of an image display device; and, FIG. 3 is a diagrammatic representation of an image display control mechanism.
Figure 3:
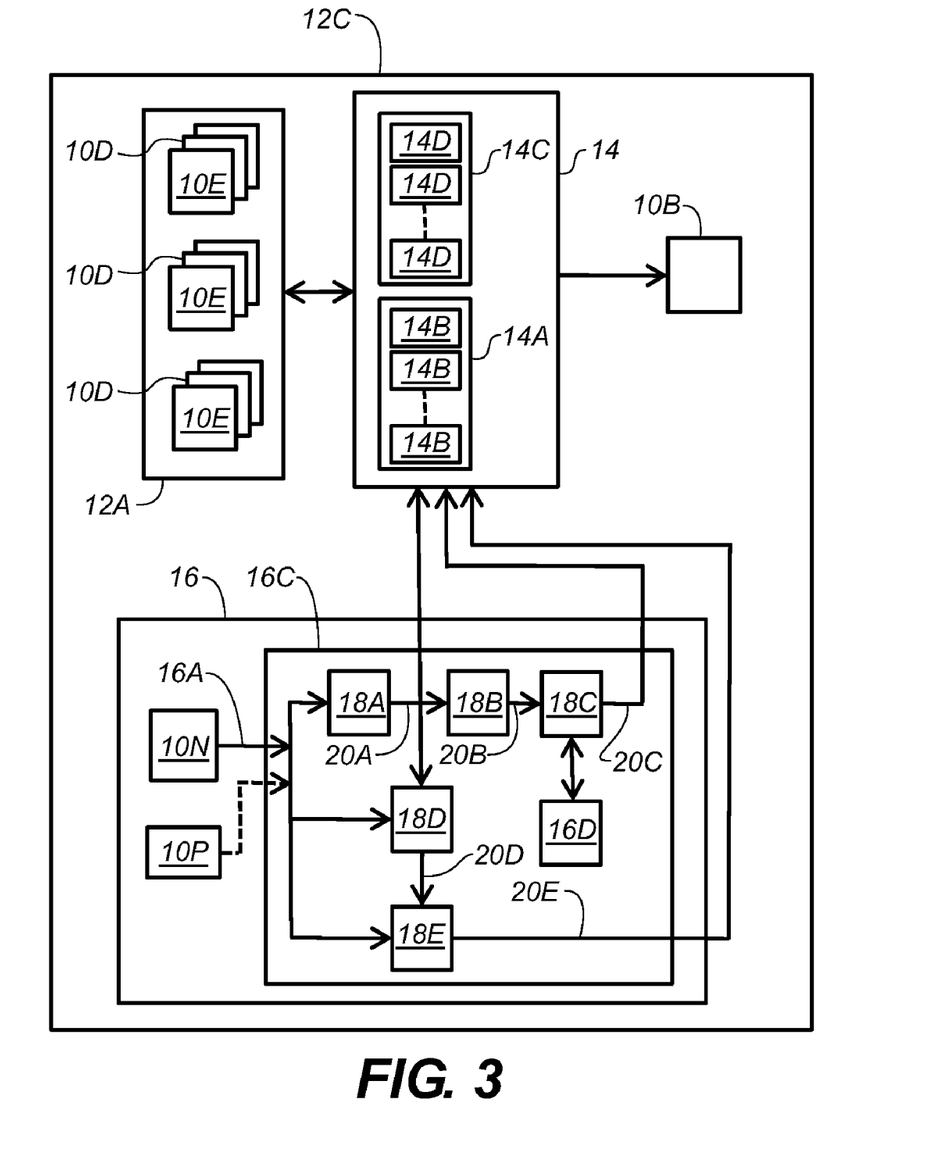

FIGS. 1 and 2 respectively show diagrammatic representation of an exemplary image display device 10 in which the present invention is implemented, an image display system 12 embodied in image display device 10 and an image display control mechanism 12C embodied in an image display system 12. The exemplary image display device 10 and image display system 12 and image display control mechanism 12C shown in FIGS. 2 and 3 are represented as being comprised, for example, of an electronic digital image frame display but, as indicated above, may be comprised of any system or device capable of displaying still and sequential images, such as a personal computer, a personal computer acting as a terminal connected from a remote service provider, a notebook computer or notepad or handheld device, such as a PDA or phone type device, and so on.

As shown in FIG. 1, the exemplary image display device 10 further referred to as display device 10 includes, for example, a frame 10A supporting a display screen 10B, an electronics and memory unit 10C connected to display screen 10B for storing and displaying one or more sets 10D of images and informational programs 10E through display screen 10B, and a local control input 10F connected to electronics and memory unit 10C capable of storing predefined data in a data storage medium for direct user control of the device 10. Display device 10 may further include a wireless modem 10G connected to electronics and memory unit 10C for downloading images and informational programs 10E from a remote node 10H, such as a connection 10I to a service provider 10J, a local media device 10K connected to electronics and memory unit 10C such as a disk drive unit, or a connection 10L between electronics and memory unit 10C and a local image source 10M, such as a personal computer of some form.

According to the present invention, display device 10 will further include an image capture device 10N, such as a digital camera or an imaging sensor, or a set of digital cameras, or imaging sensors, which may operate in a visual range of wavelengths or be sensitive to a wider range of wavelengths such as infrared. Additionally, the digital camera could be a multi- or hyper-spectral camera, capable of capturing spectral image of the environment, or a combination of digital cameras operating in several ranges of photonic spectra. Display device 10 may further include other electronic and/or chemical sensors 10P providing image and data inputs 10O to electronics and memory unit 10C for the control of display device 10 as described in detail in the following. Other elements of the display device 10 and display system 12, such as various forms of power supply and various implementations thereof, will be understood by those of ordinary skill in the relevant arts to be included in the device 10 and system 12 without further description thereof as such elements are well known in the prior art.

Referring to FIG. 2, electronics and memory unit 10C typically includes a memory 12A for storing one or more sets 10D of images and informational programs 10E received from, for example, a remote node 10H through wireless modem 10G, a service provider 10J through a connection 10I, a local media device 10K, or a local image source 10M. Also in memory unit 10C is a system control mechanism 12B typically comprised of program modules for controlling the general operation of the device 10, and an image display control mechanism 12C, typically comprised of program modules, for controlling the selection and display of images 10D as described below. System and image display control mechanisms 12B and 12C control a processor unit 12D that in turn controls the operations of memory 12A, display screen 10B, image capture device 10N, electronic and/or chemical sensors 10P and such of local control input 10F, wireless modem 10G, connection 10I to a service provider 10J, local media device 10K and local image source 10M as may be implemented in the device 10.

The structure, functions and operation of a system control mechanism 12B controlling processor unit 12D, memory 12A, display screen 10B, local control input 10F, wireless modem 10G, connections a service provider 10J, a local media device 10K and local image source 10M are well known and understood by those of ordinary skill in the arts and, as such, need not be described further herein. The following will therefore focus on the structure, functions and operations of image display control mechanism 12C for controlling the selection and display of images and informational programs 10E.

Referring therefore to image display control mechanism 12C as illustrated in FIG. 3, image display control mechanism 12C, which is typically comprised of a plurality of program modules and will be illustrated and discussed in the following as comprised of program modules, include a display control mechanism 14 that is responsive to an image list 14A containing image identifications 14B of the images and informational programs 10E to be selected from the one or more sets 10D of images and informational programs 10E to be displayed. In this regard, and as discussed further in the following, display control mechanism 14 may include a plurality of image lists 14A that are associated, for example, with different potential viewers of the displayed images and informational programs 10E or different themes, topics or subject matter of the displayed images and informational programs 10E.

Display control mechanism 14 may also include display definitions 14C that contain display parameters 14D controlling when and how the selected images and informational programs 10E are displayed through display screen 10B. Display parameters 14D may include, for example, whether images and informational programs 10E are to be displayed in a defined sequence or at random selection, the timing between successive images, the number of images in a sequence, the transitions between images, such as fade-in/fade-out, zoom-in/zoom-out or other display transitions, such as adjustments to an ambient brightness level when the viewer is detected to look at the screen, modifying overall display and image-specific brightness and color rendering according to the preferences of an identified viewer, automatically changing graphical user interface to accommodate the viewer's preferences, and so on, including display backgrounds and ancillary display parameters, such as sound accompaniment. These mechanisms are, however, well understood by those of ordinary skill in the arts and can be implemented using any of a variety of known methods and products and display control mechanism 14 therefore need not be described in further detail.

As shown, however, image display control mechanism 12C further includes an image control mechanism 16 for controlling the display control mechanism 14 according to a viewer's attention, emotional and behavioral reaction and determining how the device and system should react to such changes in attention, emotional and behavioral signals, i.e. transitory attentive, emotive and body gestures or actions of a viewer within a prescribed period of time. These features dynamically adapt the selection of images and informational programs 10E that are displayed, at least some parameters of the display operations, such as, and for example, the initiation of display sequences, at least some display parameters, such as color and brightness rendering, the type and intervals of a display sequence and so on. According to the present invention, image control mechanism 16 controls such image control parameters according to the detected presence and attentive, behavioral and emotional response or deduced intent or desires of an image viewer and without direct or even conscious input by the viewer.

For these purposes, image control mechanism 16 includes and is connected from an image capture device 10N, which may typically be, for example, one or more digital camera or imaging sensors, and electronic sensors 10P such as acoustic, motion, vibration, temperature, electronic field, chemical or proximity sensors. Image capture device 10N is mounted onto or into frame 10A so as to sense, view and scan a volume of space in front of frame 10A that is selected to have a high probability of including the viewer' body, face and features of a viewer that is approaching or observing display screen 10B.

As illustrated in FIG. 3, image control mechanism 16 receives viewer images 16A from image capture device 10N and viewer images 16A are provided to image analysis mechanism 16B of image control mechanism 16 for analysis as described below. As indicated above, viewer images 16A are images of the space volume in front of frame 10A that has been selected to have a relatively high probability of including the body, head, face and features of a viewer of display screen 10B when such a viewer is in fact present. Viewer images 16A may be periodically or continuously updated, depending upon the below discussed operations of image analysis unit 16B and the desired response times of image control mechanism 16 to the appearance of a viewer and the viewer's responses to the images 10E being displayed.

As indicated in FIG. 3, image analysis procedures 16C of image analysis mechanism 16B repeatedly performs a sequence of image analysis operations on viewer images 16A to continuously and dynamically control the display of images and or informational programs 10E through display screen 10B. For example, viewer detection process 18A analyzes the contents of the current viewer image 16A to determine whether the current viewer image 16A includes an image or region that is identifiable as a face or a head and that may thereby comprise a potential viewer of display screen 10B, typically by analysis of the morphology and spectral histogram of the viewer image 16A. If viewer detection process 18A determines beyond a predetermined probability threshold that the viewer image 16A does or probably does include a potential viewer of display screen 10B, viewer identification process 18A generates a viewer present output 20A. Viewer present output 20A in turn, and for example, will initiate the next step in the viewer image 16A analysis process and, again for example, may initiate an initial display of images and informational programs 10E through display screen 10B.

Upon receiving a viewer present output 20A, face identification process 18B then analyzes the current viewer image 16A, again typically by analysis of the morphology and spectral histogram of the viewer image 16A, to determine whether the viewer image 16A contains a region or image that is identifiable as a face. If the process identifies a region of the viewer image 16A as comprising a face, face identification process 18B generates a face identified output 20B indicating that a face has been detected and identifying the corresponding region of the viewer image 16A.

Image analysis procedures 16C may further include a viewer identification process 18C that will attempt to provide a specific identification of a viewer present in the spatial region imaged by viewer image capture device 10N for purposes of matching a present viewer, if known, with one or more corresponding image lists 14A or image identifications 14B to, for example, initiate display of the images and/or informational programs 10E associated with that viewer, where the matching and or association could be established in various ways, such as for example, by name of the viewer, viewer's ID in various forms, or by appearance of the viewer, appearances of other people and objects with the pre-determined relationship with the viewer, or other appropriate forms of association. It will be recognized, however, that image analysis procedures 16C need not include a viewer identification process 18C in order to control the display of images in accordance with detected viewer responses to image.

For this purpose, and upon receiving a face identified output 20B, viewer identification process 18C analyzes the viewer image 16A, again typically by analysis of the morphology and spectral histogram of the viewer image 16A, to identify the specific features of the face present in the viewer image 16A. Viewer identification process 18C then compares the identified facial features from viewer image 16A with the features of one or more previously identified viewer faces stored in a viewer face library 16D and generates a corresponding viewer identification output 20C which may be provided to display control mechanism 14. If viewer identification process 18C identifies a specific viewer as present in the viewer image 16A, display control mechanism 14 may select an image list 14A or modify image list 14A accordingly to select images and or informational programs 10E or one or more sets 10D of images and or informational programs 10E corresponding to the identified viewer through various forms and rules of association. In certain embodiments the association can utilize matching a viewer appearance with the appearance of people depicted in images and or informational programs 10E and selecting images based on the matching results for displaying, or in other embodiments, performing an additional analysis of images and informational programs 10E to find imaged subjects such as for example, people, animals objects, or events, that most frequently appear in images together with the viewer to infer relationship and preferences of the viewer. Additionally, images and or informational programs associated with the viewer could be analyzed to determine their common characteristics and features such as low level properties related to color distributions, contrast, brightness, locations such as indoor/outdoor, places such as for example, beaches, geographic locations, themes such as romance, sports etc. to establish new rules for matching and associating images and or informational programs with the viewer and viewer responses. If viewer identification process 18C cannot identify a specific viewer as corresponding with facial features identified in the viewer image 16A, viewer identification output 20C will represent this fact. Display control mechanism 14 may then select an image list 14A or modify the image list 14A to identify one or more random or default images and or informational programs 10E or sets 10D of images and or informational programs 10E for display.

Lastly with regard to the viewer detection and identification processes, it must be noted that methods other than image analysis may be used to determine the presence and identification of a viewer, such as interrogation of radio frequency identification (RFID) chips or other identification signals carried by the potential viewers.

Viewer present output 20A is also provided to line of vision process 18D, which employs image understanding methods to detect the facial features, including the eyes and pupils of the eyes, among other facial features of the viewer present in the viewer image 16A. Line of vision process 18D employs this information to determine whether the viewer is in fact looking at the display screen 10B and the image or informational program 10E currently being displayed thereon and, if so, generates a corresponding display observed output 20D.

If display observed output 20D indicates that the viewer is in fact observing display screen 10B and the image or images or informational programs 10E displayed thereon, viewer response process 18E uses facial expression analysis algorithms to ascertain to at least a certain degree the viewer's response to the images and or informational programs 10E being displayed, including in particular the viewer's emotional responses to the displayed images and or informational programs 10E. Information pertaining to the emotional responses of a viewer to displayed images and or informational programs 10E in turn comprises information that may be used to deduce the desires or intentions of the viewer with respect to the displayed images and or informational programs 10E.

Viewer response process 18E generates a viewer response output 20E representing the viewer's responses to the images and or informational programs 10E currently being displayed, and response output 20E is provided to display control mechanism 14. Display control mechanism 14 in turn accordingly modifies the current image list 14A or selects an image list 14A to select images and or informational programs 10E or one or more sets 10D of images and or informational programs 10E that optimize the viewer's responses to the displayed images and or informational programs 10E.

For example, if the viewer's responses to the images and or informational programs 10E identified in a current image list 14A are generally positive, display control mechanism 14 may continue to display the images and or informational programs 10E identified in the current image list 14A. The viewer's responses are understood to be detected transitory changes in a viewer's facial features; body language characteristics such as body position, head and body pose, movements, including moving toward or from the display, stopping, hanging around, etc.; and or behavioral expressions in terms of actions, vocal and verbal reactions, including laughter, exclamations, comments, etc., usually these changes occur within a very short predetermined time span where the viewer is observing the images and or informational programs 10E, for example the transition of a viewer's facial expression from no smile, i.e. neutral to a smile, i.e. happy.

If, however, the viewer's responses tend to be negative within a predetermined time span, display control mechanism 14 may select other images and or informational programs 10E or another set 10D of images and or informational programs 10E, possibly guided by viewer preferences information stored in, for example and as discussed above, display control mechanism 14 and in association with image lists 14A.

If the viewer's responses tend to be mixed, display control mechanism 14 may modify the image list 14A to replace the image identifications 14B that are associated with negative responses with other image identifications 14B, thereby effectively generating a new image list 14A to be associated with that viewer. The process for selecting new images and or informational programs 10E or sets 10D of images and or informational programs 10E to replace the images and or informational programs 10E receiving unfavorable responses may be performed, for example, by searching the images and informational programs 10E or sets 10D of images and informational programs 10E for images similar to the images 10E that are currently being displayed and that receive favorable responses. As is well known and understood in the arts, similar images may be identified by, for example, seeking images having common or similar dates, times and location of acquisition, similar low level features, such as, for example, color histograms, textures or regions, and similar contents based on, for example, image morphology; aesthetic attributes, such as composition or perspective; and semantic properties, such as themes, events, specific objects, places or scenes.

Lastly with regard to the selection of images to be displayed, it will be noted that, as described above, the modification of one or more sets 10D of images according to a given viewer's responses will result in a new set 10D containing images and or informational programs 10E tailored to that viewer. It must also be noted that the contents of one or more sets 10D of images and or informational programs 10E need not be modified and that the responses of one or more viewers to the images 10E of a set 10D, whether positive, negative or somewhere between, may instead be noted, for example by the addition of corresponding data to the corresponding image identifications 14B of the corresponding image lists 14A. An image list 14A resulting from such a process would thereby provide a compilation or survey of viewer's responses to the images 10E of one or more image lists 14A. In addition, it must be noted that an image list 14A may not necessarily be modified solely to provide a list having positive results, but may be modified to provide a set 10D of images 10E to which the viewer has had a negative or neutral response, thereby forming a list of images that the viewer does not like rather than a list of images the viewer does like.

In another embodiment of the present invention it is to be appreciated that the above described system can be incorporated into a network of connected displays such as picture frames located in one home or distributed in many places that change content in at least some of the connected frames based on sensing presence, emotions, behavioral response of a viewer interacting with one or more of the other connected frames. By way of example, a viewer looks at a picture of a their spouse and smiles—as a result another display picture frame connected to the viewers' display on the desk of the wife at work shows the picture of her husband. In this manner the above described system imparts an emotional and behavioral response as a "Thinking of you" pictorial transmission.

In another related embodiment, this interactive system presents a number of action options for the user depending on the user's emotions, intent, behavior and context. For example where a viewer looks at the display from a couch and is fatigued (as inferred from time, user's appearance and context, i.e. couch)—the display suggests several informational programs for relaxing and leisure viewing as options for final selection. In another example of the action options embodiment, the user during a meal glances at the personal display; the system reviews latest video, email or other messages and provides commands to deal with them, i.e. view, respond, delete, store, etc.

Other aspects of the presently described system includes the potential for a presentation modality that displays multiple images at once and then re-arranges them and zooms such as to emphasize the item of interest and attention according to the viewer's emotional and behavioral actions. Other types of responses for intelligent frames systems include; bringing the system from sleep or changing content based on detecting the presence in vicinity, updating the user on media/ pictorial messages, presenting media animation, for example playing video represented as still imagery and/or adding computer graphics, following a subject matter link so as to present more of any particular subject to the viewers attention, playing music or changing music, sending verification of interest, attention, awareness, or comprehension to a remote user, displaying personalized content based on the user identification recognition, reacting to the user emotion: enhance, induce, modify, etc., reflecting the viewer in pictures, providing interesting information related to the picture, connecting to another person's images/multimedia content, supporting conversations of people present by bringing relevant imagery and multimedia to provide media enhanced conversations.

It is an important aspect of the present invention that the system is directed to incorporate more than just mere recognition and analysis of facial features of the viewer, but in fact includes in the analysis a multitude of additional physical and behavioral characteristics and factors, specifically interactions and modifications of physiological behavior other than facial expressions of the viewer in response to the content of the display. As discussed in reference to FIGS. 4 and 5, prior to, or in conjunction with facial recognition the present system detects and determines at steps 101, 103 the presence and location of the viewer relative to the display and also any changes in the presence and location of the viewer to indicate such behaviors. This is a first step in a critical determination of whether the user is paying attention to the display so that the system can modify itself and the display content to continue to and better engage and enhance the viewer's attention and interaction with the display.

Figure 4:
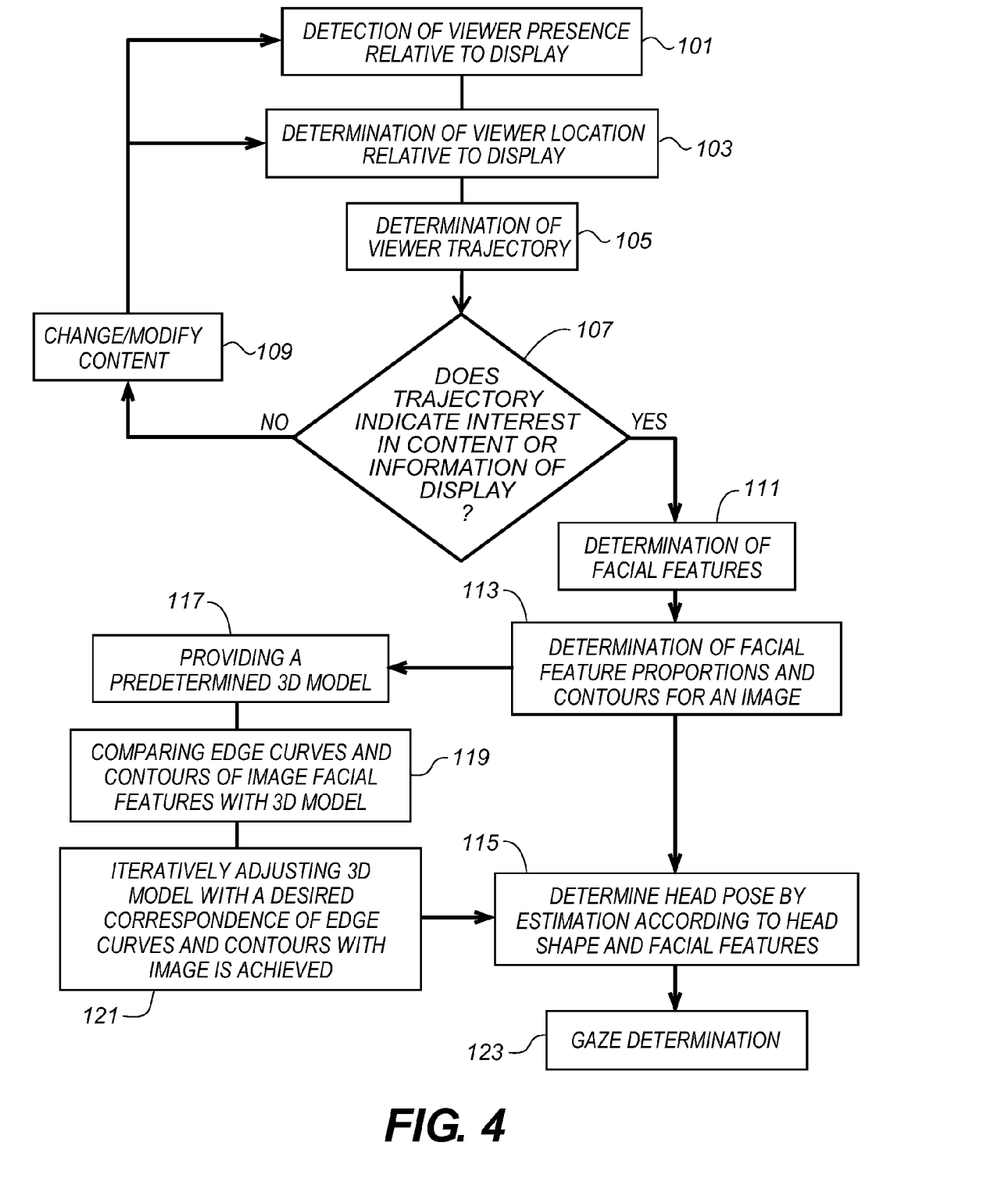
FIG. 4 is a process diagram for detection of viewer presence and the viewer gaze determination.

In an embodiment of the present invention, as shown in FIG. 4, the system detects the presence of an individual by means of an image capture device 10N or by means of one or more sensing modalities 10P such as video motion, heat, chemical, and motion sensing i.e. proximity, vibration, audio and remote electric field sensing. A video camera will detect the presence of a human subject using people and face recognition algorithms as described above. The determination of location of the viewer relative to the display at step 103 can be made by a proximity sensor, such as for example a non-contact proximity sensor with low frequency electromagnetic field could be used to detect presence of people.

Motion sensors such as a passive infrared sensor (PIR) can be used to detect the viewer's presence as well when an infrared source with a specific temperature, such as a human viewer, passes in front of an infrared source with another temperature, such as a wall. Also distance sensors, such as ultrasonic range finders, and lasers can precisely measure the distance of the nearest person or viewer in front of it. Such sensors generally have a range that varies from 10 centimeters to 7 meters.

The present invention also contemplates using vibration sensors, which are in essence motion detection and localization systems based on vibration shock sensors. The operation principle of this system is based on the fact that every moving person induces vibro-acoustical waves propagating along the surface where they are detected by sensors placed at different points of the floor surface. The data processing algorithm is based on application of neural networks. The system permits defining of a trajectory at step 105 of the viewer's movement, remaining itself absolutely imperceptible. The trajectory is important because it enables a decision process and algorithm development based on changes in the viewers speed or trajectory. For example, a viewer which comes increasingly closer to the display at an angle normal to the plane of the display is probably becoming interested in the content or information displayed therein. A viewer which is passing by the display on a trajectory parallel to the display plane at a high velocity, and without slowing down, is probably not being attracted by the contents and information on the display. In this case the system may change or modify information and content at step 109 and attempt to again detect a viewer's presence or initial interest based on location and trajectory It has to be noted however, that steps 103, 105 and 107 could be optional and omitted in alternative embodiments to proceed directly to determination of facial features in step 111. In this case step 109 involving changing or modifying information and content could be performed at different steps of the invention which are aimed at detecting viewer's position relative to the display and his or her interest in display content.

An acoustic or audio sensor can be used to detect acoustic signals which are indicative of a human-related physical activity, such as walking, talking, using devices such as cell phones, MP3 players, etc. in the vicinity of a display. Electric field sensors can be used to detect presence of a human viewer by sensing bio-electrical activity indicative of humans. An example of such a sensor could be a novel, low noise, high-input-impedance probe which can sense the electrical activity of the heart or other types of bio-signals at a distance. The description of this sensor can be found in R J. Prance, S. Beardsmore-Rust, A. Aydin, C. J. Harland and H. Prance in "Biological and medical applications", *Proc. ESA Annual Meeting on Electrostatics* 2008, *Paper N2*.

Once the detection and relative location and/or speed of the viewer is obtained and determined the system attempts to determine in greater detail whether the user is paying attention to the display. A preferred method of determining whether the user or viewer is attracted or paying attention to the displayed information is to detect whether the viewers gaze is directed toward the display. To this end the viewer's facial image is acquired at step 111 with the video camera or other image capture device that is a part of the display system, and detection of facial features is performed. Methods for detecting human faces are well known in the art of digital image processing. For example, a face detection method for finding human faces in images is described in the following article: Jones, M. J.; Viola, P., "Fast Multi-view Face Detection", IEEE Conference on Computer Vision and Pattern Recognition (CVPR), June 2003.

Once a face position is discerned by the system the facial features (e.g. eyes, nose, mouth, etc.) can also be localized using well known methods including for example, energy minimization with template matching for locating the mouth, eye and iris/sclera boundary. Facial features can also be found using active appearance models and in a preferred embodiment, the method of locating facial feature points based on an active shape model of human faces according to an algorithm which identifies multiple facial feature points related to the eyes, mouth, nose, brows, etc. and defines the contours i.e. the topography of the viewer's eyes, mouth and nose and overall facial construction at step 113. Based on the contours of the viewer's features and overall facial construction, knowledge of facial proportions and their symmetry data, a head pose of the viewer at step 115 can be estimated relative to the camera and consequently to the displayed content. Optionally, a change and modification of content can take place following the head pose estimation to attempt to detect any changes in viewer's head pose that could be associated with the displayed content.

Head pose includes three angular components: yaw, pitch, and roll. Yaw refers to the angle at which a head is turned to the right or left about a vertical axis. Pitch refers to the angle at which a head is pointed up or down about a lateral axis. Roll refers to the angle at which a head is tilted to the right or left about an axis perpendicular to the frontal plane. Yaw and pitch are referred to as out-of-plane rotations because the direction in which the face points changes with respect to the frontal plane. By contrast, roll is referred to as an in-plane rotation because the direction in which the face points does not change with respect to the frontal plane.

Model-based techniques for pose estimation typically recreate and produce an individual's 3-D head shape from an image and then use a predetermined 3-D model at steps 117-121 to estimate the head's orientation. In a preferred embodiment of the present system, edge curves (e.g., the contours of eyes, lips, and eyebrows) are first defined for the 3-D model. Next, an input image is searched for curves corresponding to those defined in the model. After establishing a correspondence between the edge curves in the model and the input image at step 119, the head pose is estimated at step 121 by iteratively adjusting the 3-D model through a variety of pose angles and determining the adjustment that exhibits the closest curve fit to the input image. The pose angle that exhibits the closest curve fit is determined to be the pose angle of the input image. Thus, a viewer profile of composite 3-D models is an important tool for further pose estimation that enables refined 3-D models and improved viewer identification.

In alternative embodiments other techniques including appearance based methods, feature based techniques or a combination of several techniques can be used for pose estimation instead or in addition to the model-based pose estimation performed at steps 113-121. Appearance-based techniques for pose estimation can estimate head pose by comparing the individual's head to a bank of template images of faces at known orientations. The individual's head is believed to share the same orientation as the template image it most closely resembles. Other appearance-based techniques may employ Neural Networks or Support Vector Machines or other classification methods to classify the head pose. A feature-based method of pose estimation is described by A. Savakis, M. Erhard, J. Schimmel, and J. Hnatow in the paper entitled "A Multi-Camera System for Real-Time Pose Estimation," *Proc. SPIE Defense and Security Symposium, Intelligent Computing: Theory and Applications V*, Orlando, Fla., April 2007. In this paper extraction of two eyes and a mouth can lead to yaw estimation from a geometric model adhering to human biological constraints, while pitch and roll are assumed to be small.

Figure 5:
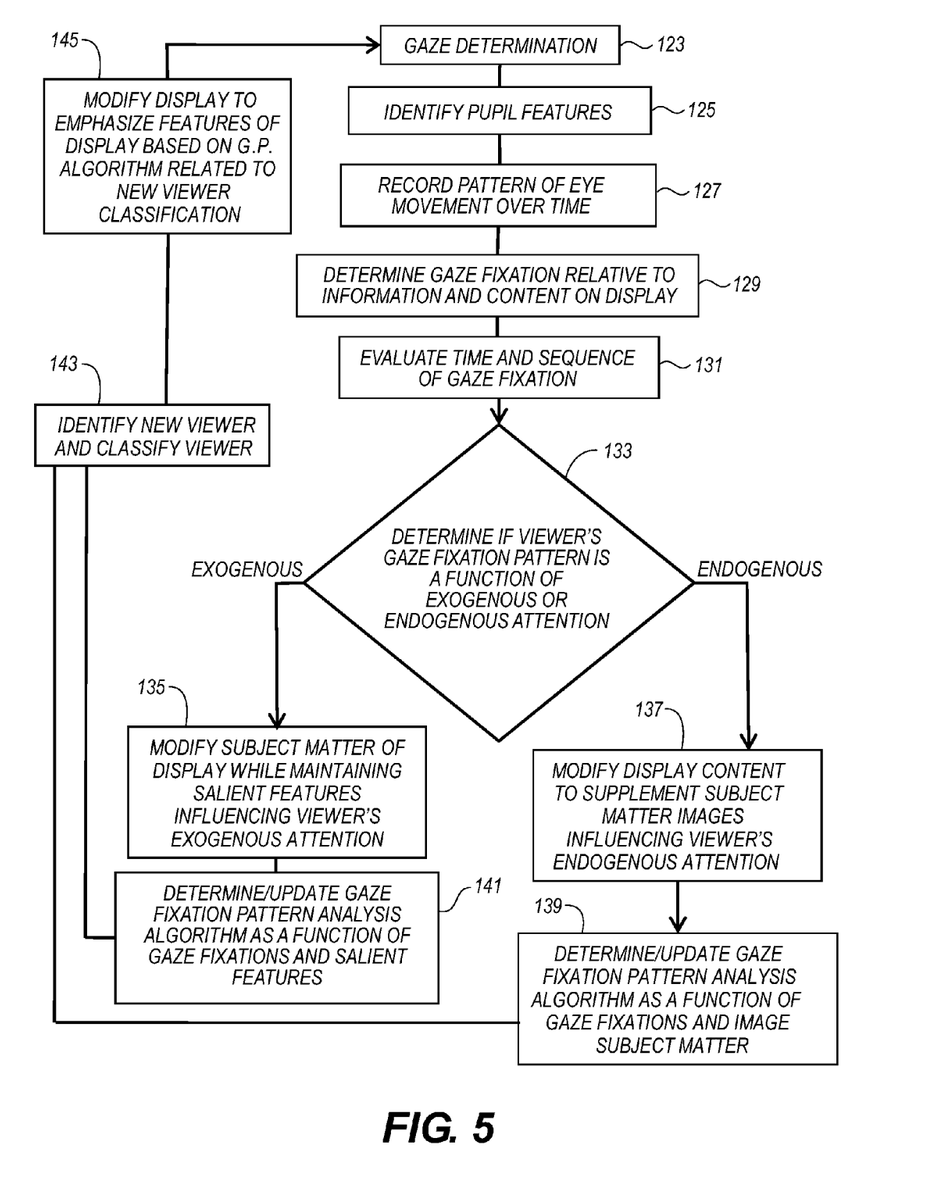
FIG. 5 is a process diagram for evaluating attention and viewing intent based on gaze determination.

The head pose estimation is very important since it can be used to provide a gaze determination at step 123 and whether the viewer is looking toward the display. This is based on the observations that, typically, the gaze direction is collinear with the head pose. Turning to FIG. 5, to make the gaze determination more robust identification of pupils position relative to the centers of the eyes is needed at step 125 To further determine that the viewer is viewing content and information presented on the display and paying attention to the information, the patterns of eye movements are assessed over time at step 127 in relationship to the information or images presented on the display at step 129. The eye movements estimated based on the viewer head pose and pupil position are represented as fixations of eye gaze and analyzed in terms of their location relative to the displayed images and or informational programs, their spatial and temporal sequence, and duration, such that a viewer head pose and long duration of eye gaze at the display would indicate a gaze fixation point and that the viewer is paying attention to the information and content at step 131. In alternative embodiments the patterns of eye movements and corresponding eye fixations at step 127 could be assessed directly from the gaze determination at step 123, which is derived from the head pose estimation directly, thus omitting step 125. In such cases assessments of patterns of eye movements and eye fixations will be approximate and be based on the above-mentioned observations regarding head pose-gaze direction collinearity.

Where the gaze fixations are occurring in terms of displayed image attributes and visual features of presented informational material relates to the viewer visual attention. There exist several attentional control mechanisms, generally referred as exogenous attention and endogenous attention. Endogenous attention is related to the elements of the displayed information and content, which are task- and/or experience-dependent and typically object-driven.

Exogenous attention on the other hand is governed by low level visual features, such as local contrast, color, motion and is generally unrelated to or outside the influence of the subject matter of the content itself or viewer's goals and motivations. These low level visual properties grab exogenous attention involuntarily as compared to the volition driven endogenous attention. Models of exogenous attentional control assume a saliency map, which indicates relative importance or activation of a given location. Such a saliency map can be computed via image analysis to extract maps of low level visual features, i.e. color, orientation, local contrast, etc. The intensity of computed local features is then summed up for each location to obtain a resultant saliency map. According to existing models the saliency maps would then define attentional control in the visual field and consequently eye movements where only bottom up visual processing would be taking place.

The bottom-up activations however are modulated by endogenous control mechanism, such as for example, a top-down gain, or endogenous feature-based control mechanism that reflects and emphasizes the contribution of a particular feature map to saliency in the current task and environment. Additionally, a scene-based endogenous control can take place, which guides attention to visual field regions that have high probability to be relevant based on the task and coarse spatial properties or gist of the scene (see, for example, A. Torralba, A. Oliva, M. Castelhano and J. M. Henderson, "Contextual Guidance of Attention in Natural scenes: The role of Global features on object search", Psychological Review. Vol 113(4) 766-786, October, 2006.).

Visual attention is associated with the gaze and could be analyzed on the basis of what a person is looking at in a visual environment in step 133. Therefore gaze information obtained via an interactive display system and corresponding characteristics of the image the person was fixating upon provide a basis to infer about the focus of a viewer's attention and his or her visual interest toward the content and features of the image and informational material.

An algorithm for interacting with the intelligent display system based on detecting where the person is paying attention and inferencing attentional focus of the user in the environment can be exemplified by the step of determining the gaze direction of the user, determining spatial locations and pattern of gaze (fixations), and determining if the user is paying attention to the display based on the gaze information. With such information the system can undertake the further steps of analyzing the current visual display information related to the fixations to interpret characteristics of attention, interest and attentional control. Based on this analysis the system can change the characteristics of displayed information or content in accordance with the previous step.

By way of example in step 133, the first few determined gaze fixations of the viewer might indicate that the viewer is drawn to salient low level features: colors, contrast, edges. The pattern is exogenous and does not indicate interest or preferential viewing of certain objects: the likelihood of looking at objects of potential interest does not increase with time, which otherwise would likely indicate that the person positively reacts to the depicted object (see, for example, Shimojo et al., "Gaze bias both reflects and influences preference", Nature Neuroscience, 6, pp. 1317-1322, 2003). In alternative embodiments facial expression of emotions can also be used to verify absence of a positive reaction of the viewer. To engage the viewer's attention a modification of the information and content and characteristics of the display is presented with strong salient features to keep the user looking at the screen while the subject matter could be changed at step 135.

In another example the viewer's fixations reveal predominantly endogenous nature of attentional control and are determined to concentrate upon certain presented objects in the content and do not simply follow the bottom-up salient features. This can be interpreted that the user is interested in the subject matter and objects depicted. More images with the same object and main subject can be shown at step 137, or display or presentation characteristics may change to support viewing and reward the viewer's attention. Alternately, a facial expression recognition can be utilized together with the viewer's fixation analysis to more precisely determine viewing intent and emotional reaction of the viewer.

The system rewards attention of the viewer by modifying content in such a way as to promote continued interaction. Bringing such interactivity and relevant content and information into a displayed program is known to enhance user interest and to provide more efficient information processing. The key is to decide which information is relevant. The viewer sensing system with image and context understanding features is providing relevant information, which is then used to offer a targeted content modification and appropriate interactivity.

Several techniques can be automatically employed to enable the invention, for example, in one embodiment several informational programs are presented simultaneously on a large format display. The viewer's preference for one of the programs is reflected by the viewer's gaze, body gestures and motion, and is established to bring the program content that the viewer user is most interested in or focused on to the central location of the display or to the most proximal location to the subject by re-arranging the displayed content and information. Other program content could even be maintained still visible, but adjusted in relative size or position with respect to the viewer's preferences. Other means to emphasize the user's interest can be employed, such as for example, by highlighting the content and information the viewer is gazing at. A more complex ways of re-arranging presented information to reward a user's interest is to adapt the content according to experimentally shown preferences in information processing observed for different classes of users. With respect to gender differences, for example, it has been shown that female viewers tend to orient themselves in the spatial environment by focusing their attention to local features of the visual environment such as landmarks, while males tend to globally survey the environment and pay more attention to its global structure. Therefore, if the gender of the viewer is detected, the determination can then be made to rearrange the visual design and content of displayed information to ensure its presentation in accordance with the viewer's advantageous information processing capabilities. The gender of the viewer can be determined, for example, by analyzing images of the viewer captured by the digital camera or an imaging sensor using an algorithm described by A. Gallagher, A. Blose, T. Chen, in "Jointly Estimating Demographics and Height with a Calibrated Camera", IEEE International Conference on Computer Vision (ICCV), 2009.

These additional physical and environmental characteristics determined by the system can also be the basis for the modification of the interest level of the viewer toward visual content and information. The visual content of any presented informational program can be modified according to spatial and temporal modifications, such as for example, highlighting local areas by changing brightness and color of those local areas to guide the gaze of the viewer along a predetermined path that has been established for the viewer whose interest level related to the content of an informational program is known.

Many online advertising companies are using banners and pop-up windows to attract the gaze of the user to the specific location of the screen with the intent to attract viewers' attention. The data however show that often this technology creates an opposite effect because the users or viewers find it distractive and annoying. At the same time, such data according to psychological experiments shows the possibility of solving the problem by guiding the gaze of the viewer to replicate the gaze of a previous viewer or viewers who successfully and appropriately responded to modifications of the content and information.

The method for such modification of interest level of a viewer would work as follows: The system obtains a gaze and pattern of eye movements corresponding to a first viewer exhibiting the target level of interest toward an informational program as in steps 123-135, 137. The system then creates a gaze pattern algorithm at steps 139, 141 to guide the gaze of an arbitrary viewer who may potentially be interested in an informational program. After identifying a second viewer at step 143, the algorithm consists of successive emphasis of certain display areas to highlight parts of the displayed informational content corresponding to the gaze scan path of the first viewer with the target level of interest toward the informational program at step 145. The gaze patterns associated with each successive viewer may be used to update and modify the algorithm after each viewer, based on a statistical analysis and comparison with salient features of each viewer. In this way a number of different algorithms may be developed for application to differently classified viewers in order to present the most relevant information and content to the viewer.

In another aspect of the present invention the system may modify the content or information on a display by incorporating elements descriptive of the viewer. It is known from psychological experiments that viewers prefer images that look familiar. Familiar images tend to also be viewed longer by a viewer. Other experiments demonstrate that viewers prefer faces that resemble faces of themselves and their close relatives. Even political leaders tend to be judged as more effective, trustworthy etc., by viewers if the leader's face(s) are morphed with the face of the viewer. Therefore it can be expected that informational programs may become more efficient in attracting and maintaining viewers' attention, interest and preferential review while producing a desired impact if they are using familiar images and multimedia material.

In summary, therefore, the method and system of the present invention for the adaptive display of images will continuously determine the responses of a viewer to images by facial expression analysis of the viewer's features to determine the emotional and other responses of the viewer to the images, and will adapt the set of images displayed to the user accordingly.

The invention has been described in detail with particular reference to certain preferred embodiments thereof, but it will be understood that variations and modifications can be effected within the spirit and scope of the invention.

PARTS LIST

- 10 image display device
- 10A frame
- 10B display screen
- 10C memory unit
- 10D image sets
- 10E informational programs
- 10F local control input
- 10G wireless modem
- 10H remote node
- 10I connection
- 10J service provider
- 10K local media device
- 10L connection
- 10M local image source
- 10N image capture device
- 10O image inputs
- 10P sensors
- 12 image display system
- 12A memory
- 12B system control mechanism
- 12C image display control mechanism
- 12D processor unit
- 14 display control mechanism
- 14A image list
- 14B image identifications
- 14C display definitions
- 14D display parameters
- 16 image control mechanism
- 16A viewer images
- 16B image analysis mechanism
- 16C image analysis procedures
- 16D viewer face library
- 18A viewer detection process
- 18B face identification process
- 18C viewer identification process
- 18D line of vision process
- 18E viewer response process
- 20A viewer present output
- 20B face identified output
- 20C viewer identification output
- 20D display observed output
- 20E viewer response output

The invention claimed is:

1. An image display mechanism for controlling the display of images on an image display device in accordance with attention characteristics of a viewer to a displayed image, comprising:
    an image control mechanism for:
        determining attention characteristics for the viewer to a currently displayed image on the image display device;
        classifying the attention characteristics as exogenous attention or endogenous attention; and
        controlling the display of one or more images on the image display device responsive to whether the attention characteristics are exogenous attention or endogenous attention.

2. The image display mechanism of claim 1, wherein the image control mechanism comprises:
    an image capture device for capturing at least one viewer image in a spatial region potentially containing a viewer of the image display device;
    a viewer detection mechanism for analyzing the at least one viewer image and determining whether a viewer of the image display screen is present in the spatial region; and a line of vision process for determining whether a viewer present in the spatial region is gazing at the image display screen;

and wherein the attention characteristics for the viewer are determined include an indication of whether the viewer present in the spatial region is gazing at the image display screen.

3. The image display mechanism of claim 1, wherein the image control mechanism comprises:

a gaze pattern analysis mechanism for determining a gaze pattern for a viewer gazing at the image display screen;

and wherein the attention characteristics for the viewer include the determined gaze pattern.

4. The image display mechanism of claim 1, wherein: the display of the one or more images is controlled by modifying at least one image, by controlling the timing between the display of successive images, by controlling the transitions between images, by controlling the display sequence for a set of images, by adding sound accompaniment or by controlling the selection of an image or a set of images from an image library.

5. The image display mechanism of claim 1, wherein the attention characteristics for the viewer are determined based on the changes in the viewer's facial features, body language characteristics, vocal or verbal reactions, gaze pattern, or combinations thereof, in response to the content of the currently displayed image.

6. The image display mechanism of claim 2, further comprising:

a viewer facial library for storing facial features of at least one user, and a viewer identification mechanism for extracting viewer facial features from the viewer image and comparing the viewer facial features from the viewer image with the facial features for the at least one user, and wherein when the viewer identification mechanism identifies a correspondence between the viewer facial features extracted from the viewer image and the facial features for a particular user, the display of the one or more images is controlled by selecting at least one image to be displayed from an image set associated with the particular user.

7. The image display mechanism of claim 6, wherein the image set associated with the particular user contains imaged subjects that correspond in a predefined manner with the particular user.

8. The image display mechanism of claim 7, wherein: personalized content associated with the particular user is displayed on the image display device.

9. A method for controlling the display of images in accordance with attention characteristics of a viewer, comprising the steps of:

displaying at least one image from an image library on an image display device, determining attention characteristics for the viewer to the displayed at least one image;

classifying the attention characteristics as exogenous attention or endogenous attention; and controlling the display of one or more images on the image display device responsive to whether the attention characteristics are exogenous attention or endogenous attention.

10. The method of claim 9 wherein the control of the display of one or more images on the image display device is also responsive to an analysis of a displayed image being viewed by the viewer.

11. The method of claim 9, further comprising the steps of:

capturing at least one viewer image of a spatial region potentially containing a viewer of the image display device, analyzing the at least one viewer image and determining whether a viewer of the image display screen is present in the spatial region, determining whether the spatial region includes a region identifiable as a face, determining whether the viewer present in the spatial region is observing the image display screen, and determining a gaze pattern for the viewer present in the spatial region and observing the image display screen and wherein the control of the display of the one or more images on the image display device is further responsive to the determined gaze pattern.

12. The method of claim 9 wherein the control of the display of the one or more images includes:

modifying the selection of images from the image library in accordance with the determined gaze pattern.

13. The method of claim 11 wherein the classification of the attention characteristics as exogenous attention or endogenous attention is made according to-predefined data stored in a data storage medium of exogenous or endogenous attention.

14. The method of claim 9 wherein the display of the one or more images is controlled by modifying image data for at least one image, by controlling the timing between the display of successive images, by controlling the transitions between images, by controlling the display sequence for a set of images, by adding sound accompaniment or by controlling the selection of an image or a set of images from an image library.

15. The method of claim 9 wherein the control of the display of the one or more images includes, selecting an image having a predetermined relationship to the current image in accordance with the attention characteristics.

16. The method of claim 9, further comprising the steps of:

accessing a viewer facial library for storing facial features of at least one user, and extracting viewer facial features from the viewer image and identifying a user by comparing the viewer facial features from the viewer image with the facial features for the at least one user;

selecting or modifying at least one next image associated with the identified user.

17. The method of claim 16, further comprising the steps of selecting images to be displayed from an image set corresponding to image subjects having a predetermined association with the user.

* * * * *